July 5, 1938.   J. SMREKAR, SR   2,122,591
CATTLE FEED TROUGH
Filed Dec. 7, 1936
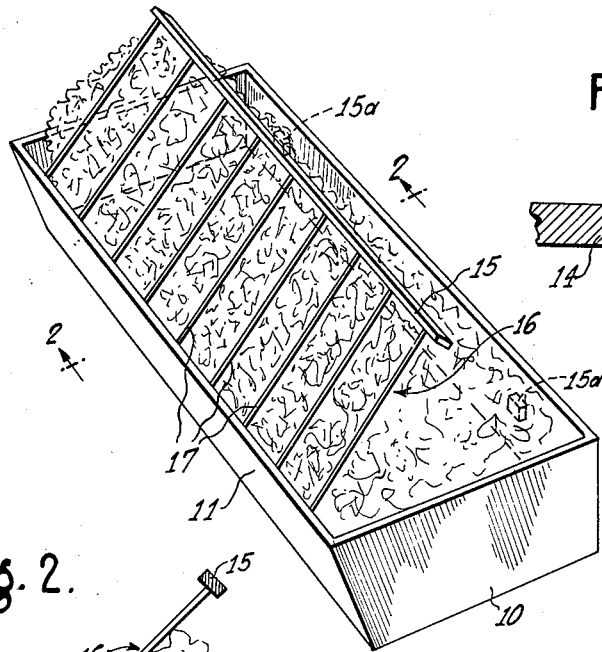
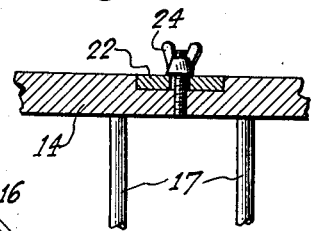
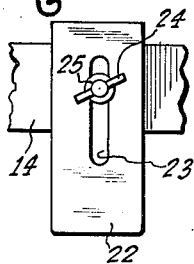
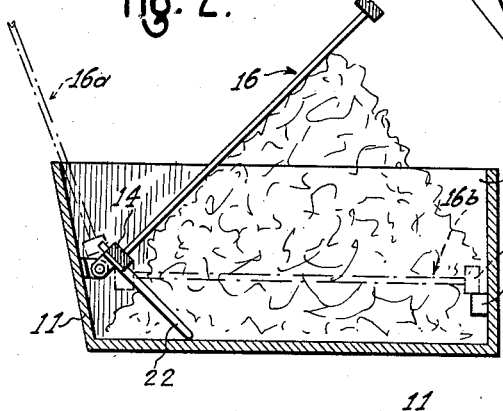
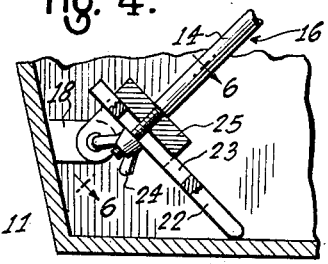
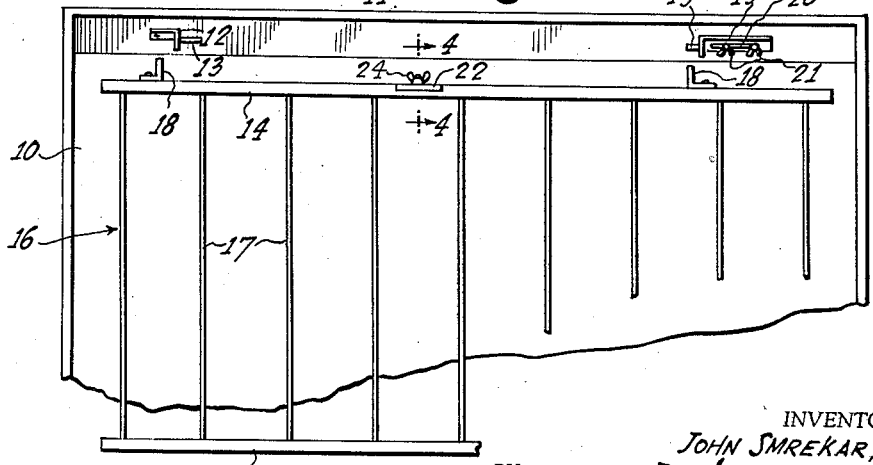
INVENTOR.
JOHN SMREKAR, Sr.
BY J. Ledermann
ATTORNEY.

Patented July 5, 1938

2,122,591

UNITED STATES PATENT OFFICE 2,122,591

CATTLE FEED TROUGH

John Smrekar, Sr., Millston, Wis.

Application December 7, 1936, Serial No. 114,595

1 Claim. (Cl. 119—60)

This invention aims to provide a novel and improved feed trough for cattle, having a number of features which will be set forth in the following specification.

One object of the invention is the provision of such a trough with an adjustable grill whereby each animal feeds within a confined area and the cattle are prevented from wasting the feed, such as hay, by drawing it out of the trough and trampling it under their feet.

A further object of the invention is the provision of means for varying the angular position of the grill which is pivotally mounted on the front wall of the trough.

The above and other objects will become apparent in the description below, in which characters of reference refer to like-named parts in the accompanying drawing.

Referring briefly to the drawing, Figure 1 is a perspective view of one form of the invention, showing the grill in partially elevated position.

Figure 2 is a cross-sectional view taken on the line 2—2 of Figure 1.

Figure 3 is a plan view of Figure 1, showing the grill in detached position.

Figure 4 is a cross-sectional view taken on the line 4—4 of Figure 3.

Figure 5 is a fragmentary view of the means for adjusting the angular elevation of the grill.

Figure 6 is a cross-sectional view taken on the line 6—6 of Figure 4.

Referring in detail to the drawing, the numeral 10 represents a conventional type of feed trough having its front wall 11 inclined at an outward angle. At spaced-apart positions on the inside of the wall 11, hinge brackets 12 and 19 are mounted, having pins 13 thereon. A grill 16 composed of oppositely-disposed side bars 14 and 15 connected by cross members 17, is rotatably mounted on the wall 11 by means of hinge ears 18 mounted on the pins 13. In the form shown in Figures 1-6 inclusive, grill 16 is removable from the wall 11 by means of the structure shown in Figure 3. The bracket 19 having the right-hand hinge pin 13 thereon, is elongated and is provided with a longitudinal slot 20. Wing nuts 21 which pass through the slot 20 serve to secure the bracket 19 against the wall 11. When it is desired to remove the grill 16, the nuts 21 are loosened and the bracket 19 is slid to the right (Figure 3). The right-hand hinge ear 18 on the bar 14 is then freed from its pin 13, and by moving the grill 16 a short distance to the right, the left-hand ear 18 also becomes free of its pin 13. The remounting of the grill 16 in the trough is accomplished by reversing the operation of the sliding bracket 19.

Near the center of the bar 14, a rigid member 22 having a slot 23 therein, is slidably mounted at right angles to the bar 14 and is releasably locked on the bar by means of a wing nut 24 and a washer 25. The member 22 serves to vary the angular elevation of the grill 16 in a manner which is obvious. This angular variation of the position of the grill 16 is desirable in the feeding of cattle to permit variation of the amount of hay fed whenever desired.

While the trough is being filled, the grill 16 is turned back into the position shown in broken lines at 16a in Figure 2. After filling of the trough, and after adjusting the position of the member 22, the grill 16 is turned back over the trough until the lower end of the member 22 meets the floor of the trough, thus retaining the grill 16 at the angular position shown in full lines in Figure 2. When the amount of feed for each animal is to be smaller, the member 22 is slid upward with respect to the grill 16, and when the member 22 is in its extreme upward position the grill 16 will lie horizontal with the floor, as shown in broken lines at 16b in Figure 2, with its bar 15 supported on the limit stop blocks 15a which are mounted on the opposite wall of the trough.

The spaces between the bar 17 of the grill 16 are each sufficient for the feeding of one animal. By using this method, it is impossible for the animal to steal feed from its neighbor, or to strew the feed on the floor. The latter difficulties generally arise when a common open trough is used for more than one animal.

It is to be noted that the trough 10 may be sunk in the barn floor with the upper edges of its walls flush with the floor level. Furthermore, the hinges of the grill 16 may be mounted near the top of the wall 11 and the blocks 15a may be similarly elevated at the same horizontal position as the hinges, so that the grill will lie substantially flush with the floor when resting on the blocks.

Obviously, modifications in form and structure may be made without departing from the spirit and scope of the invention.

I claim:

In a feed trough having a floor and walls extending upward from said floor, a grill pivotally mounted on one of said walls, blocks mounted on the opposite wall to serve as limit stops for said grill when the latter is swung into position to cover said trough, means for retaining said grill in approximately upright position when said grill is swung in the opposite direction, and slidably adjustable means on said grill for supporting said grill in any angular position with respect to the floor of said trough when said grill is swung into position over said trough.

JOHN SMREKAR, Sr.